(12) United States Patent  (10) Patent No.: US 7,832,908 B2
Peck et al.  (45) Date of Patent: *Nov. 16, 2010

(54) BEACON LIGHT WITH REFLECTOR AND LIGHT-EMITTING DIODES

(75) Inventors: John Patrick Peck, Manasquan, NJ (US); William S. Leib, III, Tinton Falls, NJ (US)

(73) Assignee: Dialight Corporation, Farmingdale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/417,820

(22) Filed: Apr. 3, 2009

(65) Prior Publication Data

US 2009/0190362 A1 Jul. 30, 2009

Related U.S. Application Data

(63) Continuation of application No. 11/300,770, filed on Dec. 15, 2005, now Pat. No. 7,568,821, which is a continuation-in-part of application No. 11/069,989, filed on Mar. 3, 2005, now Pat. No. 7,160,004.

(51) Int. Cl.
*F21V 7/00* (2006.01)
(52) U.S. Cl. ........................ 362/341; 362/227; 362/235; 362/242; 362/346; 362/540
(58) Field of Classification Search ................. 362/341, 362/227, 235, 242, 243, 247, 346, 540, 542, 362/543, 545
See application file for complete search history.

(56) References Cited

U.S. PATENT DOCUMENTS

| | | |
|---|---|---|
| 5,642,933 A | 7/1997 | Hitora |
| 5,769,532 A | 6/1998 | Sasaki |
| 5,800,051 A | 9/1998 | Gampe et al. |
| 5,929,788 A | 7/1999 | Vukosic |

(Continued)

OTHER PUBLICATIONS

Partial European Search Report for EP Application EP 06110676, Mar. 30, 2007.

(Continued)

*Primary Examiner*—Jong-Suk (James) Lee
*Assistant Examiner*—Mark Tsidulko

(57) ABSTRACT

A light-emitting diode (LED) reflector optic includes a reflector having a reflector having a plurality of reflecting surfaces, wherein each one of the plurality of reflecting surfaces is associated with at least one optical axis, each reflecting surface comprising a cross-section that is projected along a curved trajectory and a plurality of LEDs, wherein each one of the plurality of LEDs is positioned in a line parallel to the cross-section of an associated one of the plurality of reflecting surfaces and relative to the associated reflecting surface of the plurality of reflecting surfaces such that a central light-emitting axis of each one of the plurality of LEDs is angled relative to the at least one optical axis of the associated reflecting surface of the plurality of reflecting surfaces at about 90° and such that each of the reflecting surfaces redirects and collimates a light output of a respective each one of the plurality of LEDs at an angle of about 90° with respect to the central light emitting axis of each one of the plurality of LEDs, wherein each one of the plurality of reflecting surfaces receives light from each one of the plurality of LEDs from a focal distance of the associated one of the plurality of reflecting surfaces.

24 Claims, 11 Drawing Sheets

U.S. PATENT DOCUMENTS

| | | | |
|---|---|---|---|
| 6,183,100 B1 | 2/2001 | Suckow et al. | |
| 6,425,678 B1 | 7/2002 | Verdes et al. | |
| 6,464,373 B1 | 10/2002 | Petrick | |
| 6,533,446 B2 | 3/2003 | Chen et al. | |
| 6,637,921 B2 | 10/2003 | Coushaine | |
| 6,717,526 B2 | 4/2004 | Martineau et al. | |
| 6,762,695 B1 | 7/2004 | Eslambolchi et al. | |
| 6,867,710 B2 | 3/2005 | Wobben | |
| 6,948,830 B1 | 9/2005 | Petrick | |
| 7,160,004 B2 | 1/2007 | Peck | |
| 7,568,821 B2 * | 8/2009 | Peck et al. | 362/341 |
| 2003/0193807 A1 | 10/2003 | Rizkin | |
| 2004/0042212 A1 | 3/2004 | Du et al. | |
| 2004/0057234 A1 | 3/2004 | Mohacsi | |
| 2004/0085764 A1 | 5/2004 | Martin et al. | |
| 2005/0128744 A1 | 6/2005 | You et al. | |
| 2005/0156531 A1 | 7/2005 | Young | |
| 2006/0012990 A1 | 1/2006 | Walser et al. | |
| 2006/0176702 A1 | 8/2006 | Shen et al. | |

OTHER PUBLICATIONS

PCT Search Report and Written Opinion for PCT/US07/68967, Sep. 15, 2008.

Extended European Search Report for Application No. EP 06110676, Jun. 20, 2007.

\* cited by examiner

US 7,832,908 B2

BEACON LIGHT WITH REFLECTOR AND LIGHT-EMITTING DIODES

CROSS REFERENCE TO RELATED APPLICATION

This application is a continuation of U.S. patent application Ser. No. 11/300,770, filed on Dec. 15, 2005, now U.S. Pat. No. 7,568,821 which is a continuation-in-part of U.S. patent application Ser. No. 11/069,989, filed on Mar. 3, 2005, now U.S. Pat. No. 7,160,004 which is hereby incorporated by reference in its entirety.

BACKGROUND OF THE INVENTION

1. Field of the Invention

The present invention generally relates to a light source, and more particularly to a light-emitting diode (LED)-based beacon light.

2. Description of the Related Art

A beacon light such as, for example, an aircraft obstruction light, can be used to mark an obstacle that may provide a hazard to aircraft navigation. Beacon lights are typically used on buildings, towers, and other structures taller than about 150 feet. Previous beacon lights generally exhibit relatively poor energy efficiency, which can prohibit the use of solar panels to power the beacon light. Previous beacon lights may also contribute to light pollution, i.e., direct light at angles undesirably above and below a specified plane. Previous beacon lights may also be too large and heavy for climbers to carry and therefore may require additional machinery or manpower to be hoisted into position.

SUMMARY OF THE INVENTION

Various deficiencies of the prior art are addressed by the present invention, one embodiment of which is a beacon light having a light-emitting diode (LED) reflector optic. The LED reflector optic comprises a reflector having a plurality of reflecting surfaces, wherein each one of said plurality of reflecting surfaces is associated with at least one optical axis, each reflecting surface comprising a cross-section that is projected along a curved trajectory and a plurality of LEDs, wherein each one of the plurality of LEDs is positioned in a line parallel to said cross-section of an associated one of said plurality of reflecting surfaces and relative to said associated reflecting surface of said plurality of reflecting surfaces such that a central light-emitting axis of each one of the plurality of LEDs is angled relative to the at least one optical axis of said associated reflecting surface of the plurality of reflecting surfaces at about 90° and such that each of the reflecting surfaces redirects and collimates a light output of a respective each one of the plurality of LEDs at an angle of about 90° with respect to the central light emitting axis of each one of the plurality of LEDs, wherein each one of the plurality of reflecting surfaces receives light from each one of the plurality of LEDs from a focal distance of said associated one of said plurality of reflecting surfaces.

In one embodiment, the at least one LED is positioned such the central light-emitting axis is angled relative to the at least one optical axis at about 0°. In one embodiment, the about 0° has a tolerance of ±30°.

One embodiment of a method for transmitting light from a plurality of light emitting diodes (LEDs) is disclosed. In one embodiment, the method comprises arranging a plurality of reflecting surfaces relative to each other, each of the plurality of reflecting surfaces comprising a cross-section projected along a curved trajectory, positioning each one of the plurality of LEDs in a line parallel to said linearly projected cross-section of an associated one of the plurality of reflecting surfaces, wherein the positioning step angles a central light-emitting axis of each one of the plurality of LEDs relative to at least one optical axis associated with the plurality of reflecting surfaces at about 90° such that each of the reflecting surfaces redirects and collimates a light output of a respective each one of the plurality of LEDs at an angle of about 90° with respect to the central light emitting axis of each one of the plurality of LEDs, wherein each one of the plurality of reflecting surfaces receives light from each one of the plurality of LEDs from a focal distance of said associated one of said plurality of reflecting surfaces and transmitting light from the plurality of LEDs onto the associated one of the plurality of reflecting surfaces.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
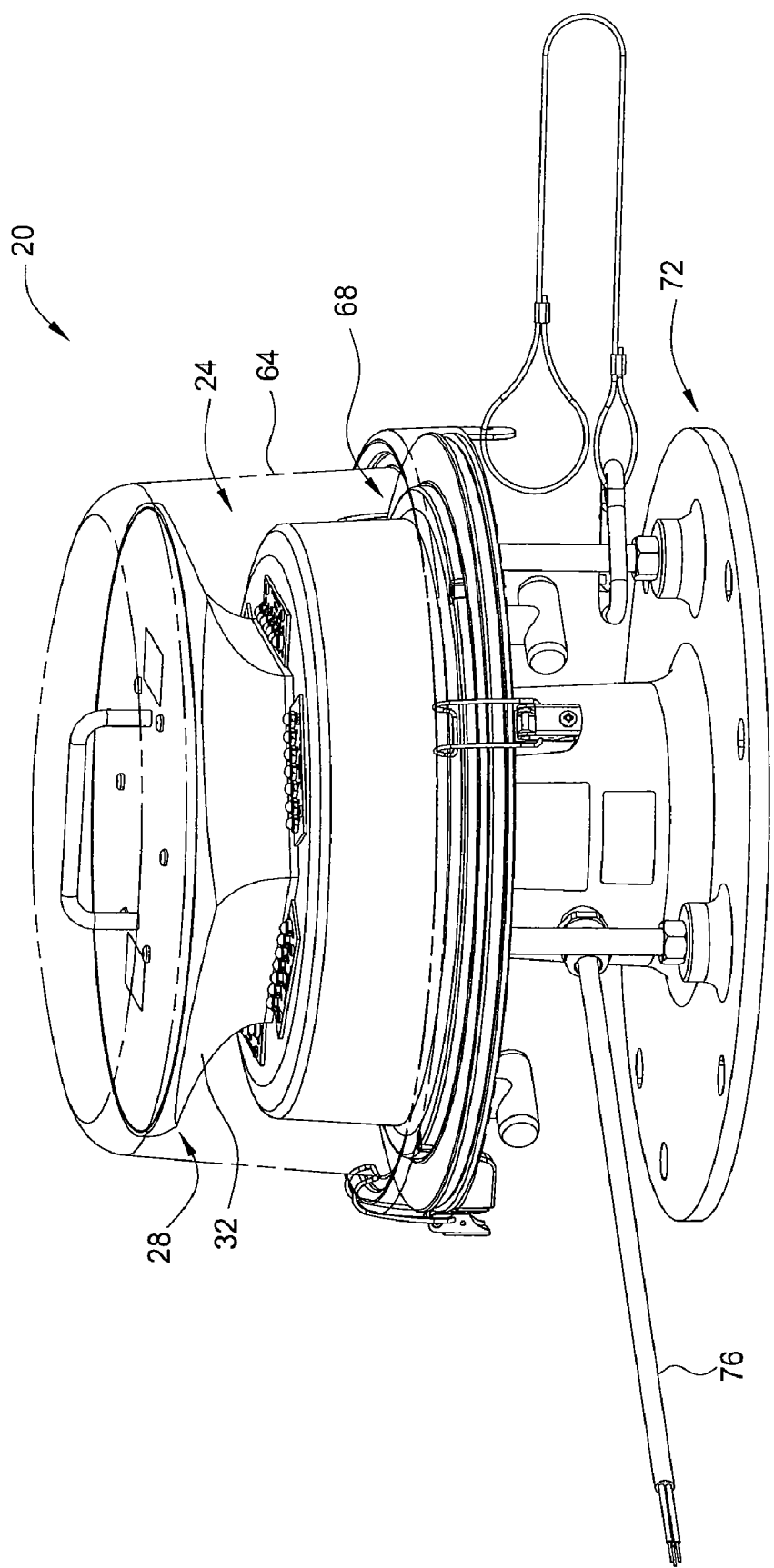
FIG. 1 depicts a perspective view of an embodiment of the beacon light according to the present invention.

FIG. 1 depicts a perspective view of a beacon light 20 according to one embodiment of the present invention. The beacon light 20 comprises an LED reflector optic 24. In one embodiment, the beacon light 20 also comprises a shield 64, a pedestal 68, a base 72, an electrical connection 76 to the beacon light 20, and circuitry (not shown) to drive the beacon light 20. In one embodiment, the drive circuitry (not shown) is capable of strobing the LED reflector optic 24. The pedestal 68 supports the LED reflector optic 24, and the base 72 provides a means for attaching the beacon light 20 to a structure.

Figure 2:
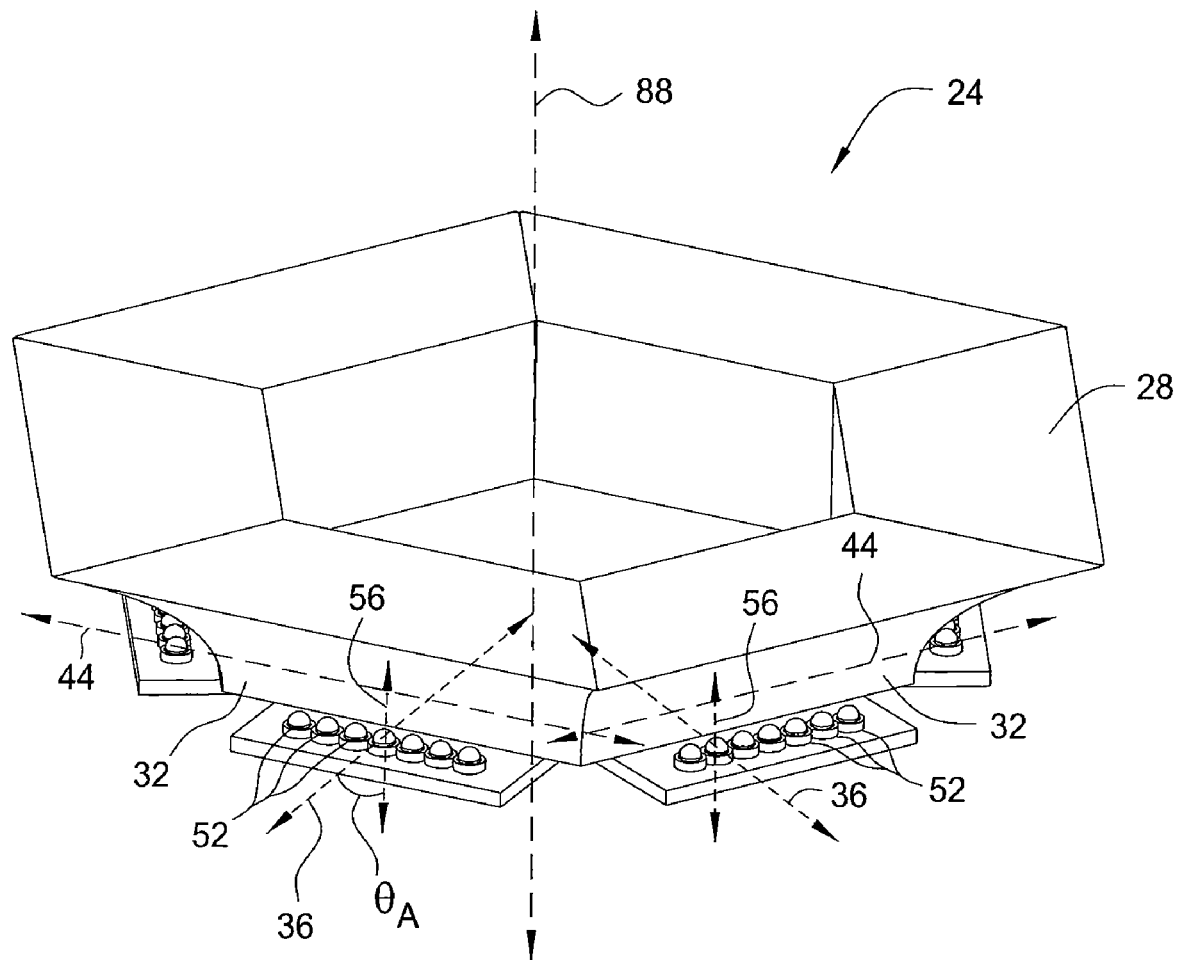
FIG. 2 depicts a perspective view of an embodiment of the LED reflector optic of the beacon light depicted in FIG. 1.

FIG. 2 depicts a perspective view of an embodiment of the LED reflector optic 24 according to the present invention. In one embodiment, the LED reflector optic 24 comprises a reflector 28 having a plurality of reflecting surfaces 32, i.e., a segmented reflector 28.

Figure 8:
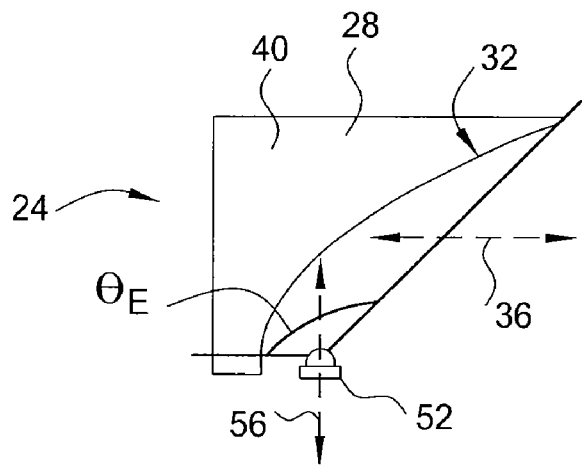
FIG. 8 depicts a partial sectional side view of an embodiment of the LED reflector optic depicted in FIG. 2.

Each reflecting surface 32 comprises a cross-section 40 (as depicted in FIG. 8) which is projected along an associated linear extrusion axis 44. In one embodiment, the linearly projected cross-section 40 comprises a conic section. A conic section provides an advantageous reflected light intensity distribution. In one embodiment, the cross-section 40 of the reflecting surface 32 comprises at least one of: a conic or a substantially conic shape. In one embodiment, the conic shape comprises at least one of: a hyperbola, a parabola, an ellipse, a circle, or a modified conic shape.

Each reflecting surface 32 has an associated optical axis 36. In one embodiment, each reflecting surface 32 reflects a beam of light having an angular distribution horizontally symmetric to the associated optical axis 36, i.e. symmetric about the associated optical axis 36 in directions along the extrusion axis 44.

For each reflecting surface 32, the LED reflector optic 24 comprises at least one associated LED 52. The LED 52 has a central light-emitting axis 56, and typically emits light in a hemisphere centered and concentrated about the central light-emitting axis 56. The LED 52 is positioned relative to the associated reflecting surface 32 such that the central light-emitting axis 56 of the LED 52 is angled at a predetermined angle $\theta_A$ relative to the optical axis 36 associated with the reflecting surface 32. In a preferred embodiment, $\theta_A$ has a value of about 90°. In one embodiment, the about 90° has a tolerance of ±30°, i.e., from 60° to 120°.

Figure 3:
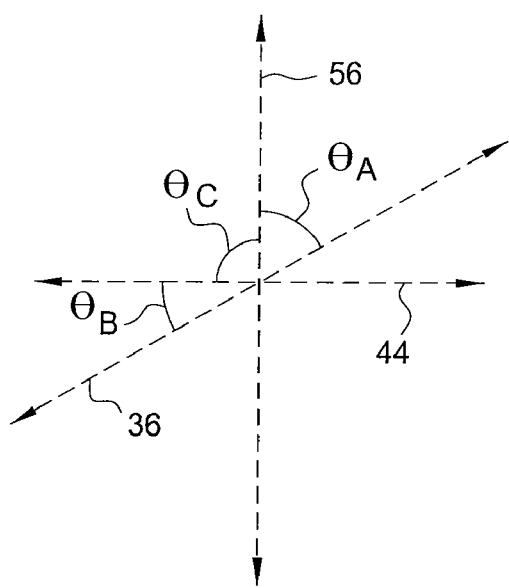
FIG. 3 depicts a perspective view of an embodiment of the angular relationship between the optical axis associated with the reflecting surface of the LED reflector optic depicted in FIG. 2, the central light emitting axis of the LED of the LED reflector optic, and the extrusion axis of the reflecting surface.

In one embodiment, for a specific reflecting surface 32 and associated LED 52, the central light-emitting axis 56 of the LED 52, the optical axis 36 associated with the reflecting surface 32, and the extrusion axis 44 of the reflecting surface 32 form orthogonal axes of a 3-axes linear coordinate system. Namely, the central light-emitting axis 56, the optical axis 36, and the extrusion axis 44 are mutually perpendicular. FIG. 3 depicts a representation of the mutually perpendicular relationship between the central light-emitting axis 56, the optical axis 36, and the extrusion axis 44. In FIG. 2, $\theta_B$ is the angle between the optical axis 36 and the extrusion axis 44, and $\theta_C$ is the angle between the central light emitting axis 56 and the extrusion axis 44. In one embodiment, the mutually perpendicular relationship between the central light-emitting axis 56, the optical axis 36, and the extrusion axis 44 is approximate. For example, each of the central light-emitting axis 56, the optical axis 36, and the extrusion axis 44 can be angled at 90° from each of the other two axes, with a tolerance, in one embodiment, of ±30°.

In one embodiment, for each reflecting surface 32, the LED reflector optic 24 comprises a plurality of associated LEDs 52. In one embodiment, the plurality of associated LEDs 52 are arranged along a line, as depicted in FIG. 2, parallel to the extrusion axis 44 of the reflecting surface 32. In one embodiment, the plurality of associated LEDs 52 are staggered about a line. For example, in one embodiment, the plurality of associated LEDs 52 are staggered about a line, with the staggering comprising offsetting the LEDs 52 from the line by a predetermined distance in alternating directions perpendicular to the line. Also, in one embodiment, the LED 52, or the plurality of LEDs 52, are positioned at the focal distance of the reflecting surface 32.

Figure 4:
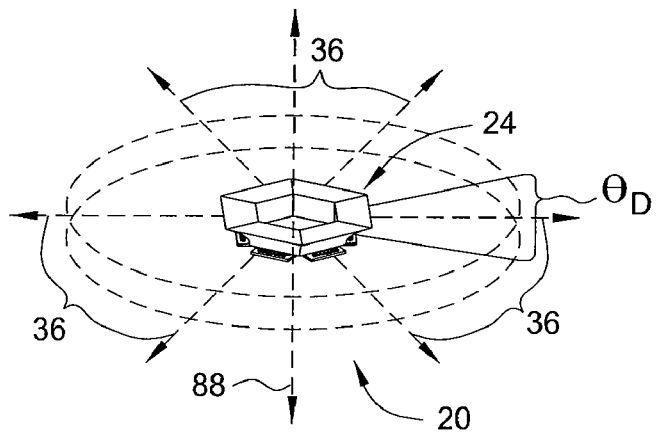
FIG. 4 depicts a partial perspective view of an embodiment of the beacon light depicted in FIG. 1.

FIG. 4 depicts a partial perspective view of an embodiment of the beacon light 20 in which the beacon light 20 emits light outward over a 360° angular distribution about a central axis 88 of the reflector 28 of the LED reflector optic 24. Such a 360° angular distribution of reflected light may be a requirement for the beacon light 20 to provide obstruction warning in all directions.

The light emitted from the beacon light 20 has a predetermined beam spread $\theta_D$, as depicted in FIG. 4. The beam spread $\theta_D$ is the angle, vertically perpendicular to the optical axes 36 of the reflecting surfaces 32, over which the intensity of the emitted light is greater than 50% of the peak intensity of the emitted light. In a preferred embodiment, the beacon light 20 has a beam spread $\theta_D$ of less than 3°. In another embodiment, the beacon light 20 has a beam spread $\theta_D$ of less than 10°.

Figure 5:
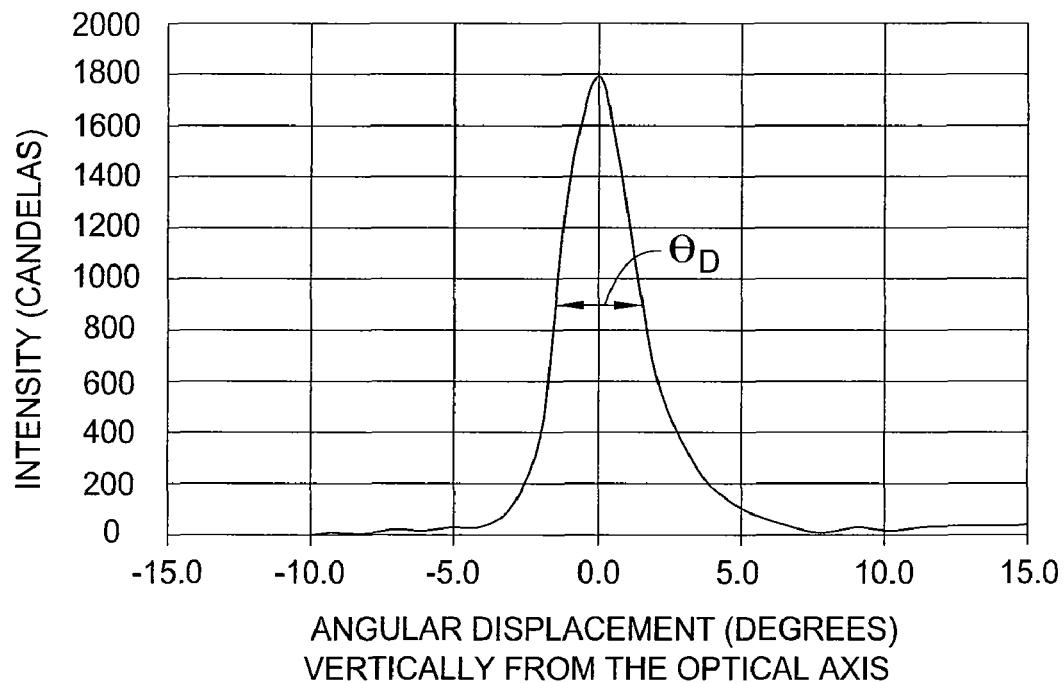
FIG. 5 is a graph depicting a representation of the intensity, versus angular displacement vertically from the optical axis, of light emitted from an embodiment of the beacon light depicted in FIG. 1.

FIG. 5 is a graph depicting a representation of the light intensity, versus angular displacement vertically perpendicular to the optical axes 36, emitted from an embodiment of the beacon light 20. FIG. 5 shows the beam spread $\theta_D$ for this embodiment is approximately 3°, i.e., about 1.5° on either side of a plane containing the optical axes 36.

Figure 6:
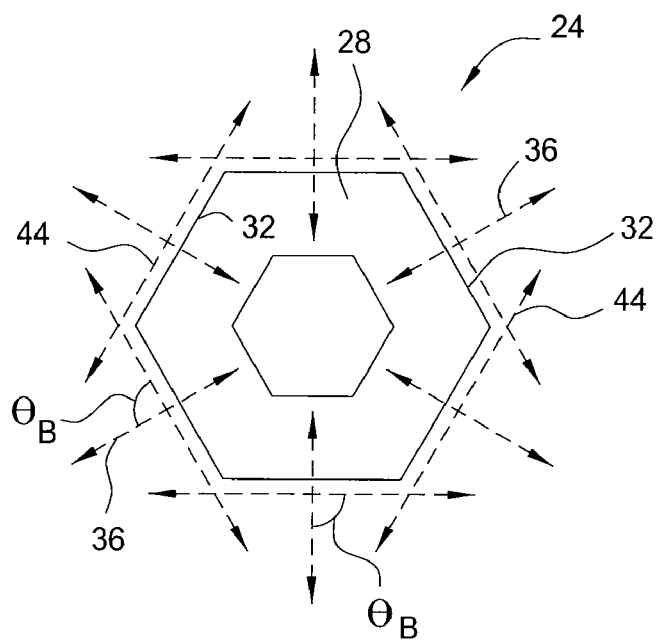
FIG. 6 depicts a sectional top view of an embodiment of the reflector of the LED reflector optic depicted in FIG. 2.

The plurality of reflecting surfaces 32 of the reflector 28 are arranged so that each of the associated extrusion axes 44 is angled relative to the extrusion axis 44 of another reflecting surface 32. In one embodiment, the plurality of extrusion axes 44 occupy a single plane and intersect each other to outline a polygon. Namely, a top view cross-section of the reflector comprises a perimeter which is a polygon. FIG. 6 depicts a sectional top view of an embodiment of the reflector 28, showing the plurality of associated extrusion axes 44 intersecting each other to form a hexagon. Such an embodiment achieves the 360° angular distribution, relative to the central axis 88 of the reflector 28, of light emitted from the LED reflector optic 24. Each reflecting surface 32 reflects light in the direction of the optical axis 36 associated with that reflecting surface 32, and through an angular distribution horizontally symmetric to and centered to the optical axis 36.

Although FIG. 6 depicts a polygon embodiment of the reflector 28 having six reflecting surfaces 32, in another polygon embodiment the reflector 28 has at least three reflecting surfaces 32.

Figure 7:
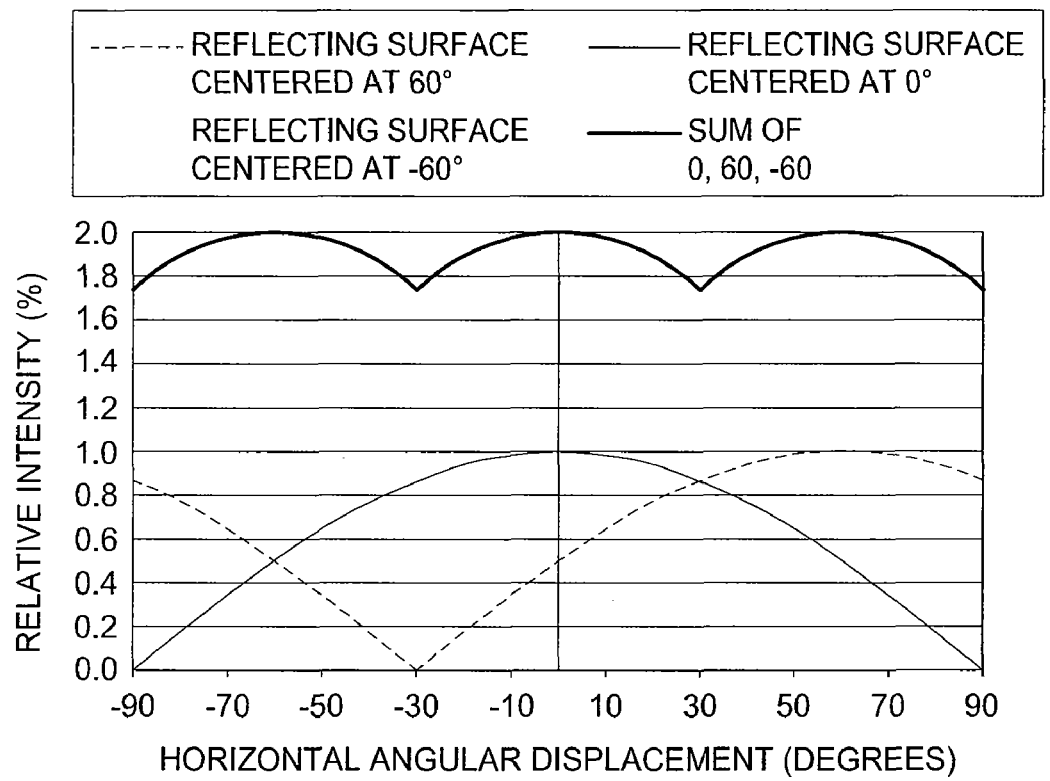
FIG. 7 is a graph depicting a representation of the relative intensity, versus angular displacement, of light reflected from three different adjacent reflecting surfaces, and the sum thereof, of an embodiment of the LED reflector optic depicted in FIG. 2.

In one embodiment, each horizontal angular distribution of reflected light associated with a specific reflecting surface 32 overlaps the horizontal angular distribution of reflected light associated with an adjacent reflecting surface 32. FIG. 7 is a graph depicting a representation of the relative intensity, versus horizontal angular displacement, of light reflected from three different adjacent reflecting surfaces 32, and the sum thereof. The thick solid line of FIG. 7 represents the overall intensity of light emitted from the LED reflector optic 24, including light reflected from all of the three adjacent reflecting surfaces 32. The thin solid line represents the intensity of light reflected from the reflecting surface 32 associated with the optical axis 36 about which the angular displacement of FIG. 7 is centered, i.e. the reflecting surface 32 having the optical axis at 0° as shown in FIG. 7. The dotted and dashed lines of FIG. 7 represent the intensity of light reflected from the two reflecting surfaces 32 adjacent and connected to the first reflecting surface 32. FIG. 7 shows that the light reflected from each reflecting surfaces 32 overlaps the light reflected from adjacent reflecting surfaces 32 to form an overall reflection of light from the reflector 28 which has a more uniform intensity profile, versus angular displacement, than the individual intensity profiles of light reflected from the individual reflecting surfaces 32.

In one embodiment, the intersection of the plurality of extrusion axes 44 does not necessarily outline a polygon. In one embodiment, light emitted from the LED reflector optic 24 does not have a 360° angular distribution relative to the central axis 88 of the reflector 28. Such an embodiment may instead achieve, for example, a 180° angular distribution.

In one embodiment, the plurality of reflecting surfaces 32 of the segmented reflector 28 are connected together.

The utilization of light emitted by the LED 52 by one embodiment of the LED reflector optic 24 provides an advantage of the present invention. To further understand this advantage, the utilization of light by one embodiment of the LED reflector optic 24 can be compared to the utilization of light in an alternative relative positioning of the LED 52 and the reflecting surface 32.

FIG. 8 depicts a partial sectional side view of an embodiment of the LED reflector optic 24. In the embodiment shown in FIG. 8, the reflecting surface 32 has a conic cross-section, and the central light-emitting axis 56 of the LED 52 is in the same plane as the shown cross-section. FIG. 8 also shows the angle $\theta_E$ over which light, emitted from the LED 52, is reflected by the reflecting surface 32.

Figure 9:
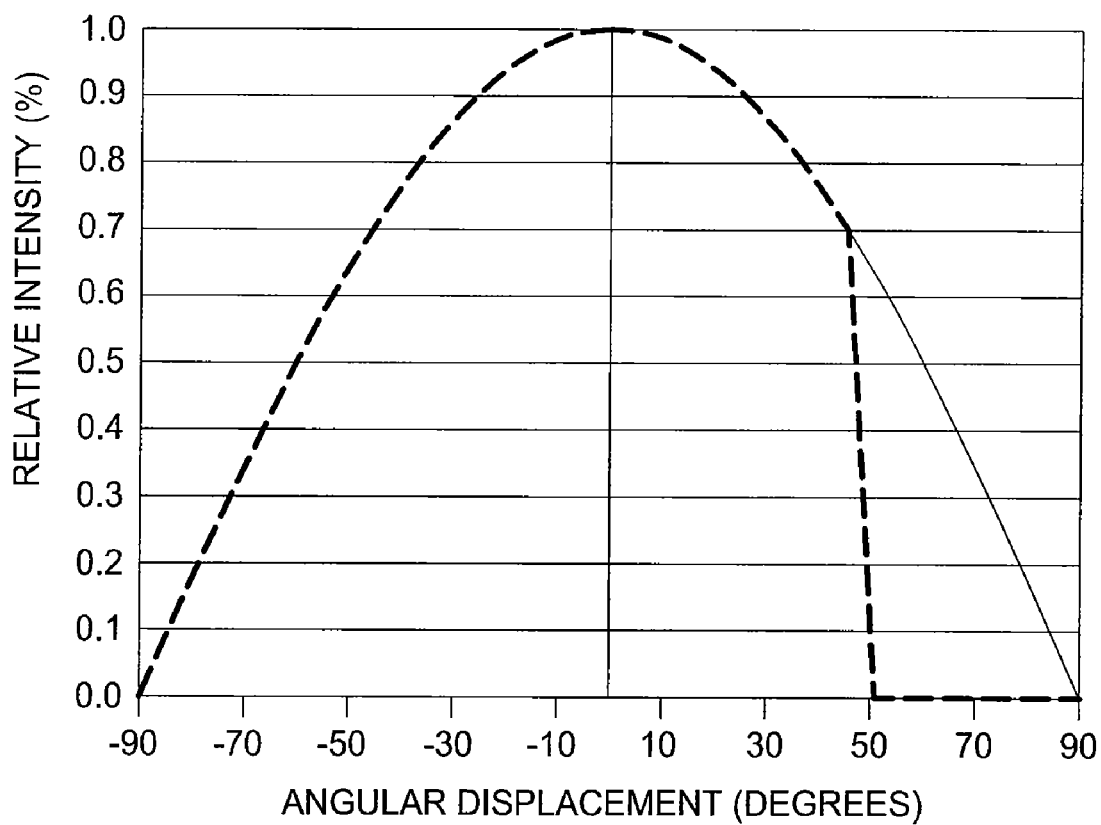
FIG. 9 is a graph depicting a representation of relative light intensity, versus angular displacement, for light typically emitted from the LED, and for light reflected by the embodiment of the LED reflector optic depicted in FIG. 8.

FIG. 9 is a graph depicting a representation of the relative intensity of light, versus angular displacement in the plane of FIG. 8, for light typically emitted by the LED 52, and for light reflected by the reflecting surface 32 of the LED reflector optic 24 shown in FIG. 8. The solid line of FIG. 9 represents the light intensity distribution typically emitted by the LED 52, i.e., without the reflecting surface 32 present, versus angular displacement relative to the central light emitting axis 56. The light intensity distribution emitted by the LED 52 is typically lambertian. However, other light intensity distributions may also benefit from the present invention. The light intensity distribution emitted by the LED 52 includes light over about 180°, i.e., about 90° on either side of the central light-emitting axis 56. The dotted line of FIG. 9 represents the portion of the light intensity distribution emitted by the LED 52 which is reflected by the reflecting surface 32 positioned relative to the LED 52 as shown in FIG. 8. The dotted line shows that light over the angle $\theta_E$, i.e., about 135°, of the angular distribution of the LED emission is reflected by the reflecting surface 32. The angle $\theta_E$ includes about 90° on one side of the central light-emitting axis 56 and about 45° on the other side of the central light-emitting axis 56. The portion of the LED emission which is reflected by the reflecting surface 32, i.e. the portion of the LED emission within angle $\theta_E$, is utilized light. The portion of the LED emission which is not reflected by the reflecting surface 32, i.e. the portion of the LED emission outside the angle $\theta_E$, is unutilized light.

Figure 10:
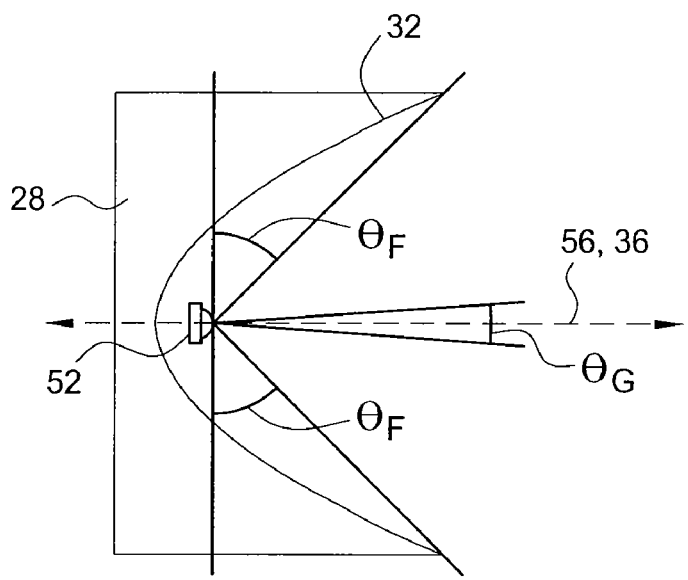
FIG. 10 depicts an embodiment of an alternative arrangement of the LED and reflecting surface.

FIG. 10 depicts an embodiment of an alternative relative positioning of the LED 52 and the reflecting surface 32. In this alternative arrangement, the central light-emitting axis 56 of the LED 52 is arranged to be parallel to the optical axis 36 of the reflecting surface 32.

Figure 11:
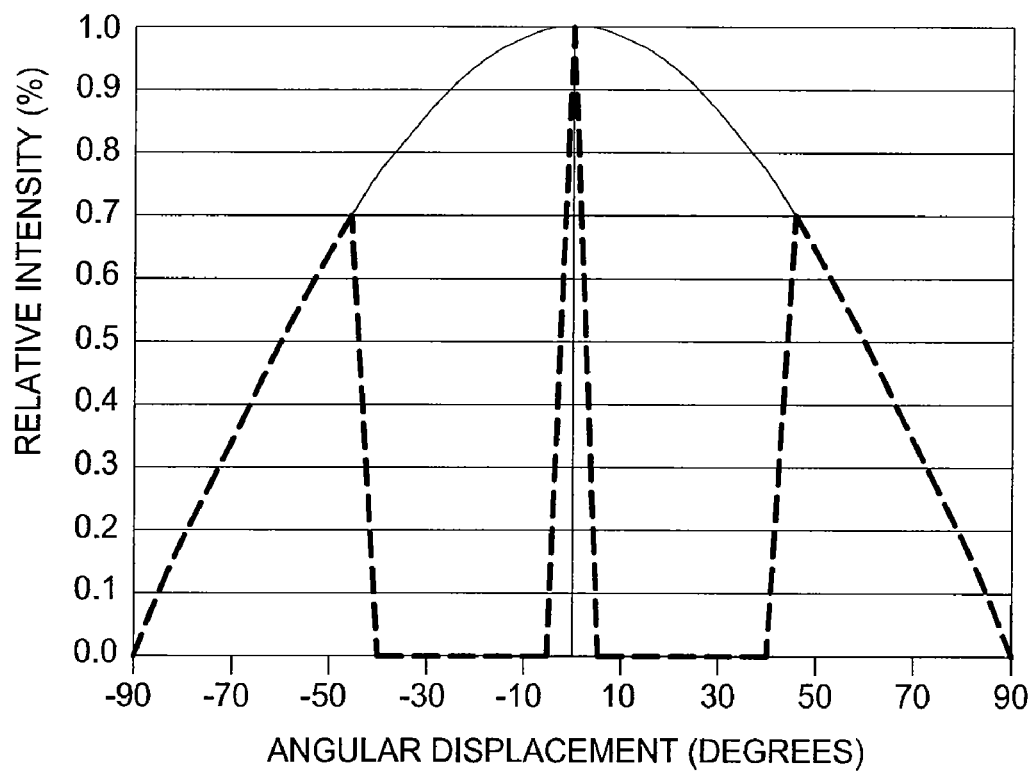
FIG. 11 is a graph depicting a representation of relative light intensity, versus angular displacement, for light typically emitted from the LED, and for light emitted from the embodiment of the alternative arrangement of the LED and reflecting surface depicted in FIG. 10.

FIG. 11 is a graph depicting a representation of the relative intensity of light, versus angular displacement in the plane of FIG. 10, for the typical light emission by the LED 52, and for light emitted by the alternative arrangement of the LED 52 and the reflecting surface 32 depicted in FIG. 10. The solid line of FIG. 11 represents the typical light intensity distribution emitted by the LED 52 without the presence of the reflecting surface 32. The dotted line of FIG. 11 represents the portion of the typical LED light intensity distribution which is utilized by the arrangement depicted in FIG. 10. The portion of light utilized comprises a first portion over an angle $\theta_G$, centered about the central light-emitting axis 56 and not reflected by the reflecting surface 32, and a second portion over an angle $\theta_F$ on either side of the central light-emitting axis 56, i.e., from 90° to 90°−$\theta_F$, and from −90° to −90°+$\theta_F$, wherein $\theta_F$ is about 45°. The first portion is utilized because if falls within the desired beam spread $\theta_D$ of the beacon light 20, and in one embodiment angle $\theta_G$ equals the beam spread $\theta_D$. The second portion is utilized because it is reflected by the reflecting surface 32 to also fall within the desired beam spread $\theta_D$ of the beacon light 20. An unutilized portion of the typical light intensity distribution which is over angles, relative to the central light emitting axis 56, from 0.5 $\theta_G$ to 90°−$\theta_F$, and from −0.5 $\theta_G$ to −90°+$\theta_F$, is not utilized because it is not reflected by the reflecting surface 32. The unutilized portion of the typical light intensity distribution emitted by the LED 52 from −0.5 $\theta_G$ to −90°$\theta_F$ is undesirable and may be considered to be light pollution because it typically points downward towards the ground from, for example, a relatively high position.

Thus, FIG. 11 shows that the alternative relative positioning of the LED 52 and the reflecting surface 32 depicted in FIG. 10 does not utilize the majority of the high intensity central portion of the light intensity distribution typically emitted by the LED 52. By comparison, the embodiment of the LED reflector optic 24 of the present invention as depicted in FIG. 8 utilizes the majority of the high intensity central portion of the light intensity distribution typically emitted by the LED 52. A numerical comparison of the light utilizations depicted by FIGS. 9 and 11 shows that the area under the dotted line in FIG. 9 is about 45% greater than the area under the dotted line in FIG. 11. Thus, the embodiment of the LED reflector optic 24 depicted in FIG. 8 provides approximately a 45% increase in light utilization from a single LED 52, in comparison to the alternative arrangement depicted in FIG. 10.

Furthermore, the embodiment of the LED reflector optic 24 depicted in FIG. 8 provides the possibility of the reflector 28 having a reduced size relative to the embodiment of the alternative arrangement depicted in FIG. 10. For example, the reflector 28 depicted in FIG. 8 has a size which is reduced by about half in comparison to the embodiment of the reflector 28 depicted in FIG. 10.

The utilization of light by the embodiment of the LED reflector optic 24 depicted in FIG. 8 of the light emitted by the LED 52 provides an advantage of the present invention. However, the present invention nonetheless provides other advantages, and thus one embodiment of the LED reflector optic 24 comprises the LED 52 positioned such that the central light-emitting axis 56 is angled at the angle $\theta_A$ having a value of about 0°, as depicted in FIG. 10. In one embodiment, the about 0° has a tolerance of ±30°, i.e., from −30° to 30°. In another embodiment, the about 0° has a tolerance of +10°, i.e., from −10° to 10°.

An exemplary illustration of another advantage provided by an aspect of the present invention is depicted in FIGS. 12-15. The projection of the cross-section 40 of the reflecting surface 32 along the linear extrusion axis 44 advantageously provides increased collimation of the reflected light.

Figure 12:
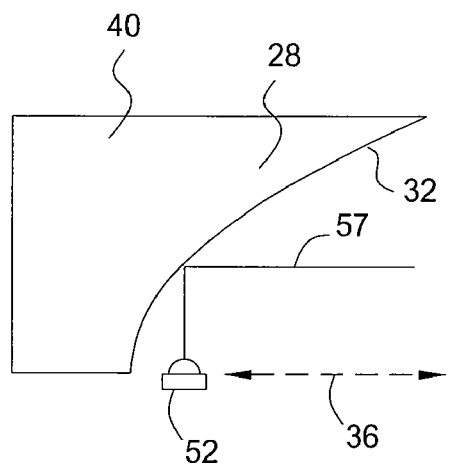
FIG. 12 depicts a partial side view of an embodiment of the LED reflector optic depicted in FIG. 2, showing mathematically simulated ray traces.

FIG. 12 depicts a partial side view of an embodiment of the LED reflector optic 24. In the embodiment of FIG. 12, the LED 52 is located at the focal distance of the reflecting surface 32 in a plane 47 (depicted in FIG. 16A). FIG. 12 also depicts mathematically simulated ray traces 57 showing the path of light traveling from the LED 52 to the reflecting surface 32 and outward from the reflector 28. Ray tracing is a technique that uses 3-D computer modeling and geometric optics to accurately determine the light path. FIG. 12 shows the ray traces 57 are parallel to the optical axis 36 in the depicted embodiment of the LED reflector optic 24.

Figure 13:
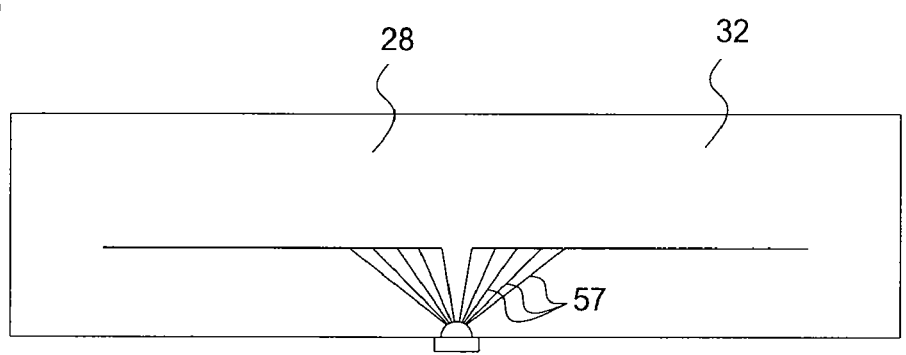
FIG. 13 depicts a partial front view of the embodiment of the LED reflector optic depicted in FIG. 12, showing the same ray traces shown in FIG. 12 from another view.

FIG. 13 depicts a partial frontal view of the embodiment of the LED reflector optic 24 depicted in FIG. 12, showing the same mathematically simulated ray traces 57 as FIG. 12, but from another view. Because the reflecting surface 32 of FIGS. 12 and 13 is a projection of the cross-section 40 along the linear extrusion axis 44, light traveling from the LED 52 to the reflecting surface results in well collimated light reflected parallel to the optical axis 36 of the reflecting surface 32.

Figure 14:
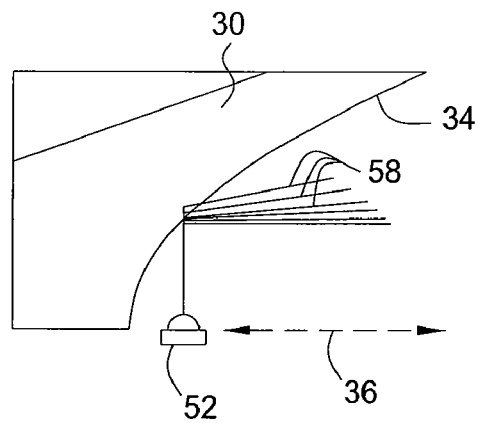
FIG. 14 depicts a partial side view of an embodiment of an alternative reflector having an alternative reflecting surface, showing mathematically simulated ray traces.

By comparison, FIG. 14 depicts a partial side view of an embodiment of an alternative reflector 30 having an alternative reflecting surface 34 which is an unsegmented reflecting surface 34. The alternative reflecting surface 34 has a cross-section that is projected along a curved trajectory 48 (as depicted in FIG. 17), not a linear axis. In the embodiment of FIG. 14, the LED 52 is located at the focal distance of the reflecting surface 32 in the plane 51 (depicted in FIG. 16B). FIG. 14 also depicts mathematically simulated ray traces 58 showing the path of light traveling from the LED 52, to the reflecting surface 32 and outward from the reflector 28.

Figure 15:
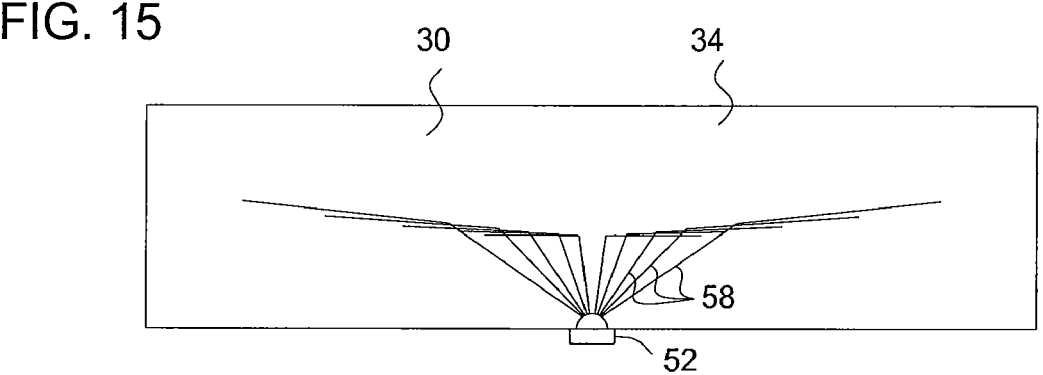
FIG. 15 depicts a partial front view of the embodiment of the alternative reflector having the alternative reflecting surface depicted in FIG. 14, showing the same ray traces shown in FIG. 14 from another view.

FIG. 15 depicts a partial front view of the embodiment of the alternative reflector 30 having the alternative reflecting surface 34 depicted in FIG. 14, and showing the same mathematically simulated ray traces 58 as FIG. 14, but from another view. FIGS. 14 and 15 shows that the light reflected by the alternative reflector 30 is not as well collimated as the light reflected by the reflector 28, as depicted in FIGS. 12 and 13. Light is reflected from the alternative reflecting surface 34 at angles vertically away from the optical axis 36.

Figure 16A:
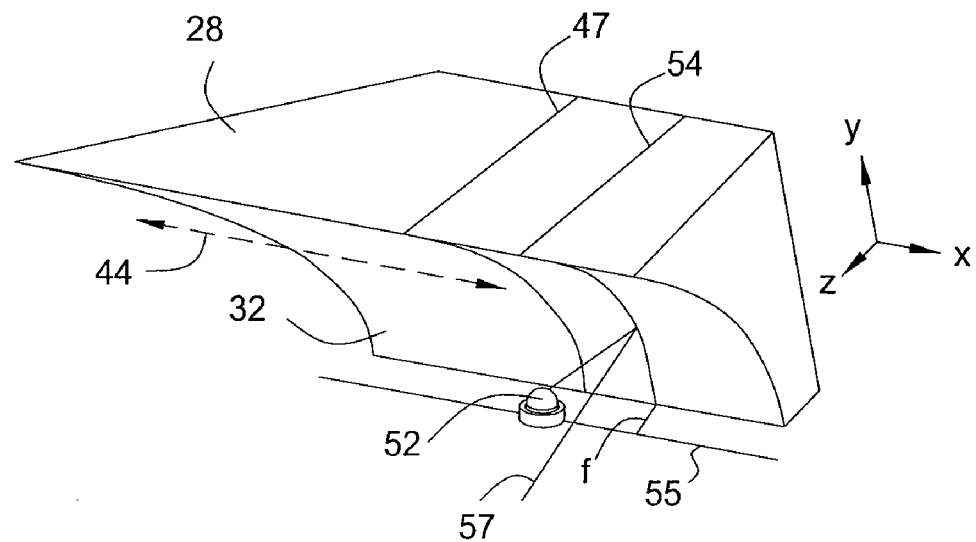
FIG. 16a depicts a perspective view of an embodiment of a segment, having the reflecting surface, of an embodiment of the LED reflector optic depicted in FIGS. 12 and 13.
Figure 16B:
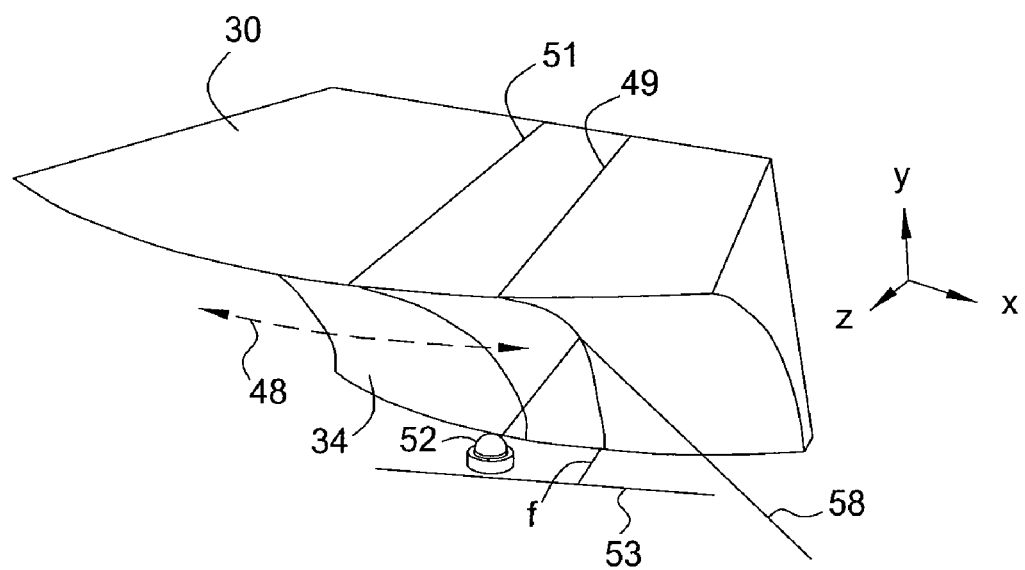
FIG. 16b depicts a partial perspective view of an embodiment the LED reflector optic having an embodiment of the alternative reflector comprising the alternative reflecting surface depicted in FIGS. 14 and 15.
Figure 17:
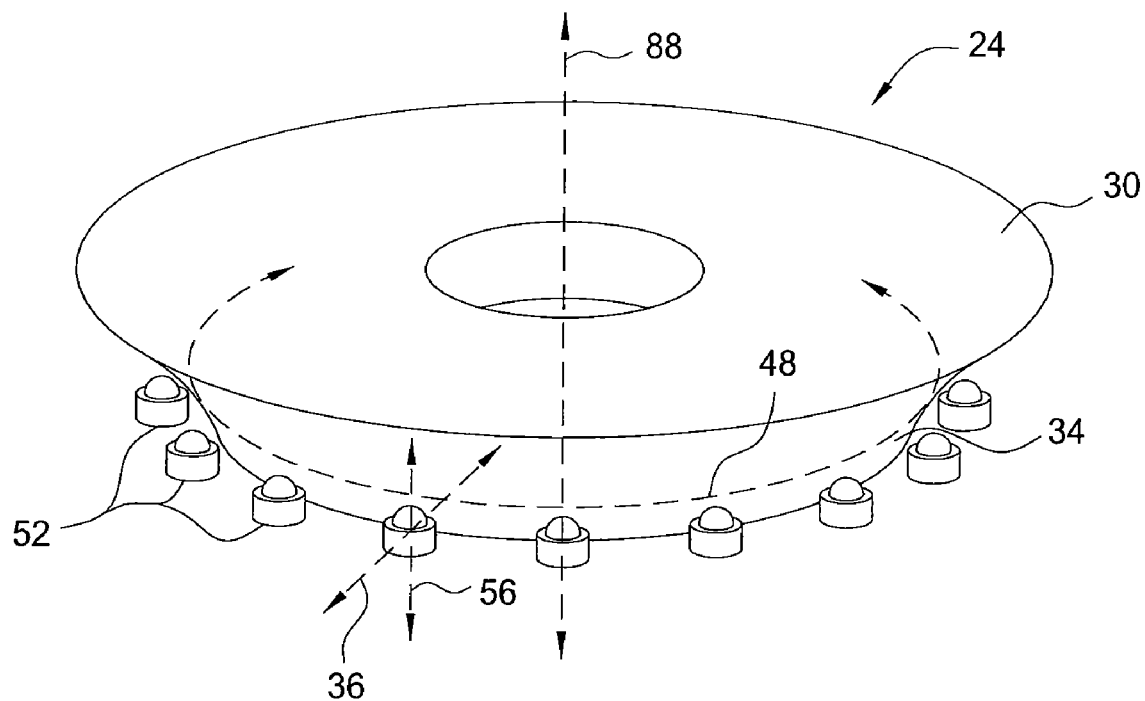
FIG. 17 depicts a perspective view of an embodiment of the LED reflector optic having an embodiment of the alternative reflector comprising the alternative reflecting surface.

FIG. 16A depicts a perspective view of an embodiment of a segment of the reflector 28 depicted in FIG. 12, and FIG. 16B a partial perspective view of an embodiment of the alternative reflector 30 depicted in FIG. 14. The increased collimation provided by the reflector 28, in comparison to the alternative reflector 30, can also be better understood in reference to FIGS. 16A and 16B. Generally speaking, a parabolic reflector, for example, receives light originating from its focal distance and reflects the light parallel to the optical axis of the reflector. If the reflector has the cross-section 40 projected along the linear extrusion axis 44, as in the embodiment of the reflector 28 depicted in FIG. 16A, then the parabolic system is lost only in the horizontal direction and is conserved in the vertical direction and the light will be collimated vertically. For example, considering light comprising vector components in the x, y and z directions depicted in FIG. 16A, line 55 demarks the focal length f for the vector component of light traveling in the y direction, and line 55 is common to the entire length of the reflector. Therefore the vector component of light emitted by LED 52 in the y direction strikes both plane 54 and plane 47 as arriving from the focal length.

By comparison, if the reflector is revolved, i.e. having the cross-section projected along the curved trajectory 48, as in the embodiment of the reflector 30 depicted in FIG. 16B, then the parabolic system is lost in both the horizontal and vertical directions. For example, FIG. 16B depicts a line 53 demarking the focal length f for the vector component of light traveling in the y direction, with respect to light arriving at plane 49, plane 49 being offset and angled horizontally from the plane 51. FIG. 16B shows that the LED 52 does not fall on the line 53 and thus does not emit a component of light in the y direction which strikes plane 49 as arriving from the focal length.

Thus, the embodiment of the reflector 28 having the projection of the cross-section 40 of the reflecting surface 32 along the linear extrusion axis 44 provides increased collimation of reflected light in comparison to the alternative reflector 30 having the alternative reflecting surface 34. However, the present invention nonetheless provides other advantages, and thus in one embodiment, as depicted in FIG. 17, the LED reflector optic 24 comprises the alternative reflector 30 having the alternative reflecting surface 34.

The LED reflector optic 24 and the beacon light 20 of the present invention provide a more efficient optical system. This more efficient optical system results in smaller and lighter devices with lower energy consumption and less light pollution. The more efficient optical system also enables greater use of solar power to power the LED reflector optic 24 and the beacon light 20.

In one embodiment, the reflecting surface 32 comprises at least one of: a metal or a reflective material. For example, in one embodiment the reflecting surface 32 comprises a reflectorized surface such as, for example, a surface comprising a layered polymer which reflects light.

Figure 18:
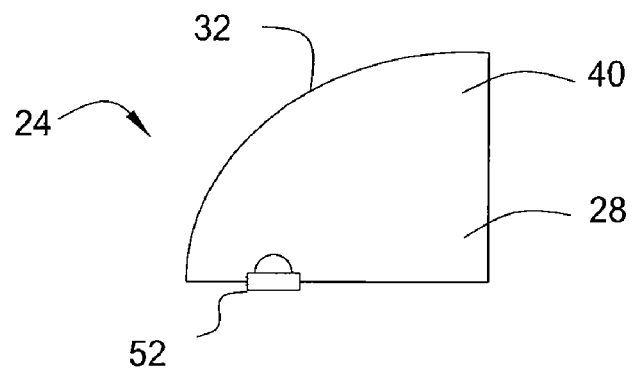
FIG. 18 depicts a partial sectional view of an embodiment of the LED reflector optic comprising at least one of: a glass, a plastic or a transparent material.

In another embodiment, depicted in FIG. 18, the reflector 28 comprises at least one of: glass, plastic or a transparent material. In the embodiment depicted in FIG. 18, the reflector 28 reflects light using total internal reflection.

The intensity distribution of light emitted from the LED reflector optic 24 can be adjusted by modifying the specific shape of the reflecting surface 32. In one embodiment, the shape of the cross-section 40 of the reflecting surface 32 is defined by the following equation:

$$z = \frac{cy^2}{1 + \sqrt{1-(1+k)c^2y^2}} + F(y), \quad (1)$$

where z is a coordinate along an axis parallel to the optical axis 36, y is a coordinate on an axis perpendicular to both the optical axis and the extrusion axis, k is a conic constant, c is a curvature, and F(y) is a variable function. FIG. 16A depicts the relationship of the z and y coordinates, as well as an x coordinate along an axis parallel to the extrusion axis 44, with respect to the reflecting surface 32.

In one embodiment, F(y) is equal to zero, and equation (1) provides a conic cross-section. For example, (k<−1) provides a hyperbola, (k=−1) provides a parabola, (−1≦k≦0) provides an ellipse, (k=0) provides a sphere, and (k>0) provides an oblate sphere, which are all forms of conics. Modifying k and c modifies the shape of the reflecting surface 32, and thus also modifies the shape of the light intensity distribution reflected by the reflecting surface 32. The reflected beam may thereby be made more narrow or broad as desired.

In one embodiment, F(y) is not equal to zero, and equation (1) provides a cross-sectional shape which is modified relative to a conic shape by an additional mathematical term or terms. For example, F(y) can be chosen to modify a conic shape to alter the reflected light intensity distribution in some desirable manner. Also, in one embodiment, F(y) can be used to provide a cross-sectional shape which approximates other shapes, or accommodates a tolerance factor in regards to a conic shape. For example, F(y) may be set to provide cross-sectional shape having a predetermined tolerance relative to a conic cross-section. In one embodiment, F(y) is set to provide values of z which are within 10% of the values provided by the same equation but with F(y) equal to zero.

In one embodiment, the specific cross-sectional conic shape of the alternative reflecting surface 34 is defined by the following set of equations:

$$z = \frac{cr^2}{1 + \sqrt{1-(1+k)c^2r^2}}, \quad (2)$$

and $$r^2 = x^2 + y^2; \quad (3)$$

where x, y, z, c and k are defined as above in regards to equation (1). FIG. 16B depicts the relationship of the x, y and z coordinates with respect to the alternative reflecting surface 34.

In another embodiment, the cross-sectional shape of the alternative reflecting surface 34 has a shape which comprises the basic conic shape modified by using additional mathematical terms. For example, in one embodiment, the cross-sectional shape of the alternative reflecting surface 34 comprises a polynomial asphere defined by the following set of equations:

$$z = \frac{cr^2}{1 + \sqrt{1-(1+k)c^2r^2}} + \sum_{n=2}^{10} C_{2n} r^{2n} \quad (4)$$

-continued
$$r^2 = x^2 + y^2; \quad (5)$$

wherein x, y, z, k and c are as defined above, and C is a constant.

In another embodiment, the shape of the cross-section 40 of the reflecting surface 32 is defined by fitting a curve, such as a spline fit, to a set of points. In one embodiment, the spline fit is used to approximate the conic or substantially conic cross-sectional shape of one embodiment of the cross-section 40.

Figure 19:
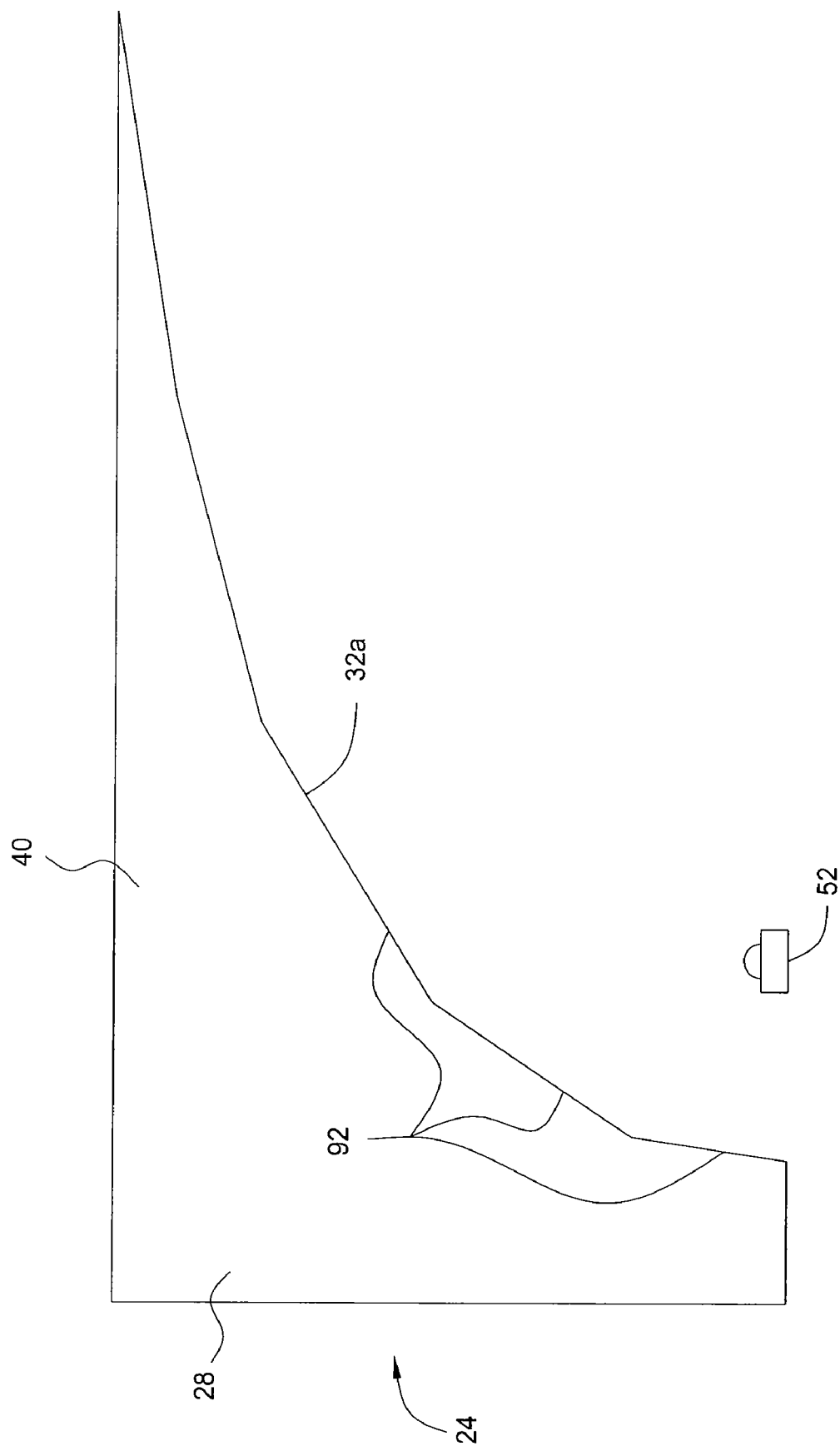
FIG. 19 depicts a partial sectional side view of an embodiment of the LED reflector optic having a faceted reflecting surface.

In another embodiment, as depicted in FIG. 19, the reflector comprises a reflecting surface which is a faceted surface 32a which has a shape which approximates a conic shape. The faceted surface 32a comprises a plurality of individual planar facets 92. Collectively, the plurality of individual planar facets 92 approximate a conic shape, with the approximation becoming more accurate as the individual planar facets 92 are made smaller.

Figure 20:
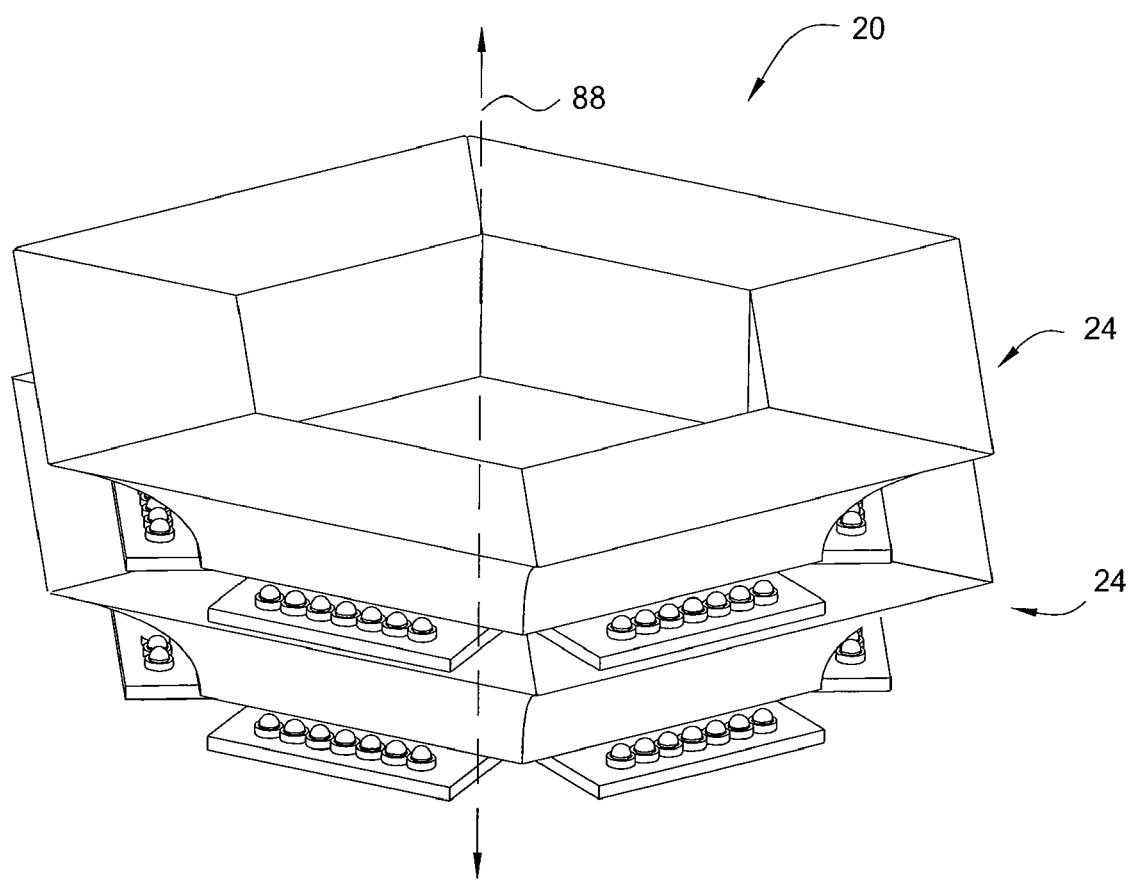
FIG. 20 depicts a partial perspective view of an embodiment of the beacon light having a plurality of the LED reflector optics.

In one embodiment, the beacon light 20 comprises a plurality of LED reflector optics. For example, FIG. 20 depicts a partial perspective view of an embodiment of the beacon light 20 which comprises a plurality of LED reflector optics 24 stacked on top of each other.

A method of using the LED reflector optic 24 or the beacon light 20 comprises arranging a plurality of the reflecting surfaces 32 relative to each other, each of the plurality of reflecting surfaces 32 comprising the linearly projected cross-section 40. The method also comprises positioning at least one LED 52 relative to at least one of the plurality of reflecting surfaces 32, wherein the positioning step angles the central light-emitting axis 56 of the at least one LED 52 relative to at least one optical axis 36 associated with the plurality of reflecting surfaces 32 at about 90°. The method also comprises transmitting light from the at least one LED 52 to the at least one of the plurality of reflecting surfaces 32. In one embodiment of the method, the about 90° has a tolerance of ±30°.

In one embodiment of the method, the at least one LED 52 comprises a plurality of LEDs 52, the at least one optical axis 36 comprises a plurality of optical axes 36, and the positioning step comprises positioning each of the plurality of LEDs 52 relative to a respective one of the plurality of optical axes 36 at about 90°. In one embodiment of the method, each reflecting surface 32 comprises a cross-section 40 projected along a linear extrusion axis 44, and the arranging step comprises arranging the plurality of reflecting surfaces 32 relative to each other so that a plurality of the linear extrusion axes 44 are angled relative to each other.

In one embodiment, the reflector optic 24 comprises a plurality of reflecting means 32 for reflecting light in the direction of at least one optical axis 36, each reflecting means 32 comprising a means for receiving light along a linearly projected cross-section 40. The optic also comprises at least one light emitting means 52 for emitting a hemisphere of light, the at least one light emitting means 52 positioned such that a central light-emitting axis 56 of the at least one light emitting means 52 is angled relative to the at least one optical axis 36 at about 90°. In one embodiment of the optic 24, the about 90° has a tolerance of ±30°.

The present invention has been generally described within the context of the LED reflector optic 24 and the beacon light 20. However, it will be appreciated by those skilled in the art that while the invention has specific utility within the context of the LED reflector optic 24 and the beacon light 20, the invention has broad applicability to any light system.

While the foregoing is directed to embodiments of the present invention, other and further embodiments of the invention may be devised without departing from the basic scope thereof, and the scope thereof is determined by the claims that follow. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

The invention claimed is:

1. A light-emitting diode (LED) reflector optic, comprising:
   a reflector having a plurality of reflecting surfaces, wherein each one of said plurality of reflecting surfaces is associated with at least one optical axis, each reflecting surface comprising a cross-section that is projected along a curved trajectory; and
   a plurality of light emitting diodes (LEDs), wherein each one of the plurality of LEDs is positioned in a line parallel to said cross-section of an associated one of said plurality of reflecting surfaces and relative to said associated reflecting surface of said plurality of reflecting surfaces such that a central light-emitting axis of each one of the plurality of LEDs is angled relative to the at least one optical axis of said associated reflecting surface of the plurality of reflecting surfaces at about 90° and such that each of the reflecting surfaces redirects and collimates a light output of a respective each one of the plurality of LEDs at an angle of about 90° with respect to the central light emitting axis of each one of the plurality of LEDs, wherein each one of the plurality of reflecting surfaces receives light from each one of the plurality of LEDs from a focal distance of said associated one of said plurality of reflecting surfaces.

2. The LED reflector optic of claim 1, wherein the about 90° has a tolerance of ±30°.

3. The LED reflector optic of claim 1, wherein each reflecting surface comprises at least one of: a conic or a substantially conic shape.

4. The LED reflector optic of claim 1, wherein the cross-section that is projected along a curved trajectory comprises a plurality of the cross-sections that are angled relative to each other.

5. The LED reflector optic of claim 4, wherein each reflecting surface is associated with one of the plurality of optical axes, and for each reflecting surface:
   the associated optical axis, the associated central light emitting axis, and the curved trajectory are approximately mutually perpendicular.

6. The LED reflector optic of claim 5, wherein the approximately mutually perpendicular has a tolerance of about ±30°.

7. The LED reflector optic of claim 1, wherein the cross-section of each reflecting surface comprises a shape which is at least one of: a hyperbola, a parabola, an ellipse, a circle, or a modified conic.

8. The LED reflector optic of claim 1, wherein at least one of the plurality of reflecting surfaces comprises a faceted surface.

9. The LED reflector optic of claim 1, wherein at least one of the plurality of reflecting surface comprises at least one of: a metal or a reflective material.

10. The LED reflector optic of claim 1, wherein the reflector comprises at least one of: glass, plastic or a transparent material; and wherein the reflector reflects light using total internal reflection.

11. The LED reflector optic of claim 1, wherein the cross-section that is projected along a curved trajectory of said plurality of reflecting surfaces of the reflector and each one of the plurality of LEDs are configured to direct light along the optical axis with a beam spread of less than 10° in a direction perpendicular to the central light-emitting axis of each one of the plurality of LEDs.

12. The LED reflector optic of claim 1, wherein the LED reflector optic comprises a plurality of LED reflector optics.

13. The LED reflector optic of claim 1, wherein said light output is collimated with a beamspread of less than 10°.

14. The LED reflector optic of claim 1, wherein each one of the plurality of LEDs has a beam spread of about 120. degrees and the associated reflecting surface of the plurality of reflecting surfaces redirects and collimates the light of a respective each one of the plurality of LEDs by receiving the LED from about 90° on one side of the central light-emitting axis and about 45° on a second side of the central light-emitting axis.

15. A light-emitting diode (LED) reflector optic, comprising:
   a reflector having a plurality of reflecting surfaces, wherein each one of said plurality of reflecting surfaces is associated with at least one optical axis, each reflecting surface comprising a cross-section that is projected along a curved trajectory; and
   a plurality of light emitting diodes (LEDs) positioned in a straight line parallel to said linearly projected cross-section of an associated one of said plurality of reflecting surfaces and relative to said associated reflecting surface of said plurality of reflecting surfaces such that a central light-emitting axis of each one of the plurality of LEDs is angled relative to the at least one optical axis of said associated reflecting surface of the plurality of reflecting surfaces at about 0° and such that each of the reflecting surfaces redirects and collimates a light output of a respective each one of the plurality of LEDs at an angle of about 90° with respect to the central light emitting axis of each one of the plurality of LEDs , wherein each one of the plurality of reflecting surfaces receives light from each one of the plurality of LEDs from a focal distance of said associated one of said plurality of reflecting surfaces.

16. The LED reflector optic of claim 15, wherein the about 0° has a tolerance of ±30°.

17. The LED reflector optic of claim 15, wherein the cross-section that is projected along a curved trajectory comprises a plurality of the cross-sections that are angled relative to each other.

18. A method for transmitting light from a plurality of light emitting diodes (LEDs), comprising:
   arranging a plurality of reflecting surfaces relative to each other, each of the plurality of reflecting surfaces comprising a cross-section projected along a curved trajectory;
   positioning each one of the plurality of LEDs in a line parallel to said linearly projected cross-section of an associated one of the plurality of reflecting surfaces, wherein the positioning step angles a central light-emitting axis of each one of the plurality of LEDs relative to at least one optical axis associated with the plurality of reflecting surfaces at about 90° such that each of the reflecting surfaces redirects and collimates a light output of a respective each one of the plurality of LEDs at an angle of about 90° with respect to the central light emitting axis of each one of the plurality of LEDs, wherein each one of the plurality of reflecting surfaces receives light from each one of the plurality of LEDs from a focal distance of said associated one of said plurality of reflecting surfaces; and transmitting light from the plurality of LEDs onto the associated one of the plurality of reflecting surfaces.

19. The method of claim 18, wherein the about 90° has a tolerance of ±30°.

20. The method of claim 18, wherein said light output is collimated with a beamspread of less than 10°.

21. The method of claim 18, wherein the arranging step comprises:

arranging the plurality of reflecting surfaces relative to each other so that a plurality of the cross-sections that are projected along a curved trajectory are angled relative to each other.

22. A reflector optic, comprising:

a plurality of reflecting means for reflecting light in the direction of at least one optical axis, each reflecting means comprising a means for receiving light along a cross-section projected along a curved trajectory; and a plurality of light emitting means for emitting a hemisphere of light, each one of the plurality of light emitting means positioned in a line parallel to said linearly projected cross-section of an associated one of said plurality of reflecting means and such that a central light-emitting axis of each one of the plurality of light emitting means is angled relative to the at least one optical axis at about 90° and such that each of the plurality of reflecting means redirects and collimates a light output of a respective each one of the plurality of light emitting means at an angle of about 90° with respect to the central light emitting axis of each one of the plurality of light emitting means, wherein each one of the plurality of reflecting means receives light from each one of the plurality of light emitting means from a focal distance of said associated one of said plurality of reflecting means.

23. The reflector optic of claim 22, wherein the about 90° has a tolerance of ±30°.

24. The reflector optic of claim 22, wherein said light output is collimated with a beamspread of less than 10°0.

* * * * *

UNITED STATES PATENT AND TRADEMARK OFFICE
CERTIFICATE OF CORRECTION

PATENT NO. : 7,832,908 B2  Page 1 of 1
APPLICATION NO. : 12/417820
DATED : November 16, 2010
INVENTOR(S) : John Patrick Peck et al.

It is certified that error appears in the above-identified patent and that said Letters Patent is hereby corrected as shown below:

Column 6, line 56, delete "-90°θF" and insert -- -90°+θF --, therefor.

Column 12, line 17, in Claim 14, delete "120." and insert -- 120 --, therefor.

Column 14, line 21, in Claim 24, delete "10°0." and insert -- 10°. --, therefor.

Signed and Sealed this
Twenty-fifth Day of January, 2011

David J. Kappos
*Director of the United States Patent and Trademark Office*